J. POLLITT.

Stop-Pulleys.

No. 6,174. Reissued Dec. 15, 1874.

Witnesses.

Hugh O'Halahuty

George G. Sill

Inventor.

John Pollitt

By W. E. Simonds Atty

THE GRAPHIC CO. PHOTO-LITH. 39 & 41 PARK PLACE, N.Y.

UNITED STATES PATENT OFFICE.

JOHN POLLITT, OF HARTFORD, CONNECTICUT, ASSIGNOR, BY MESNE ASSIGNMENTS, TO WILLARD M. WHITE, EDWIN R. CARTER, LUTHER M. SKIDMORE, AND HIRAM M. TALMADGE.

IMPROVEMENT IN STOP-PULLEYS.

Specification forming part of Letters Patent No. 150,186, dated April 28, 1874; reissue No. 6,174, dated December 15, 1874; application filed September 19, 1874.

*To all whom it may concern:*

Be it known that I, JOHN POLLITT, of Hartford, in the county of Hartford and State of Connecticut, have invented an Improved Stop-Pulley, of which the following is a specification, reference being had to the accompanying drawings, where—

Figure 1:
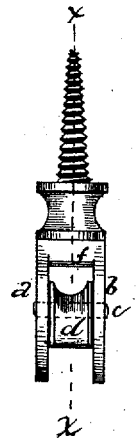
Figure 3:
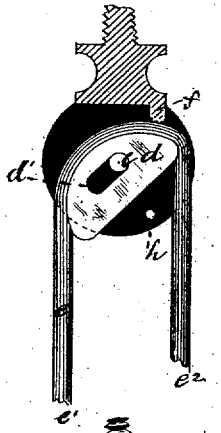
Figure 2:
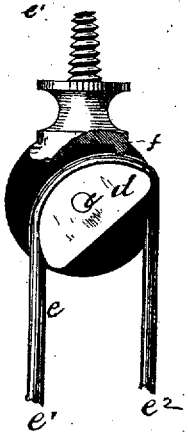

Figure 1 is what may be called a face view of the pulley. Fig. 2 is a view of the same in central vertical section on the plane indicated by the dotted line *x x*. Fig. 3 is a view, the same as Fig. 2, except that the pulley is modified by giving it the slot *d'*.

The invention is a device over which a pulley-cord will run either way at the will of the operator, though the cord may be caught and stopped when desired.

The letters *a* and *b* indicate the two side plates, and *c* the shaft, of the so-called pulley *d*, which is not really a pulley—that is, it does not rotate—over which the cord *e* slips. This pulley may have the slot *d'* to assist its action, or it may simply vibrate on the shaft *c*.

Supposing the weight to be at the end $e^1$ of the cord, and the operator's hand to have hold of the other end, $e^2$, the pulley will be tilted in the opposite direction from that shown in Fig. 2; and if the pulley be slotted, as shown in Fig. 3, the pulley will fall to the opposite end of the slot. In this position, the cord will follow the operator's hand freely. The cord will slip back in the opposite direction if the operator permits, not, however, letting up enough on the cord to permit the pulley to tilt, as shown in Figs. 2 and 3.

If the operator permits the cord to slip back quite freely the pulley will tilt, as shown in Figs. 2 and 3, and will be caught between the pulley and the spur, ledge, or shoulder *f*, and thus held suspended. A stop-spur, *h*, prevents the force exerted by the operator's hand from tilting the pulley too far.

It is practicable, if desired, to set a small pulley on the shaft *c*, centrally in the so-called pulley *d*, the so-called pulley being appropriately mortised for that purpose.

I claim as my invention—

The so-called tilting pulley *d*, in combination with the overhanging spur, shoulder, or ledge *f*, all constructed, arranged, and designed for operation and use, substantially as shown and described.

JOHN POLLITT.

Witnesses:
W. M. WHITE,
W. E. SIMONDS.